(12) United States Patent
Zhi et al.

(10) Patent No.: US 11,283,112 B2
(45) Date of Patent: Mar. 22, 2022

(54) METHOD FOR MANIPULATING AN ENERGY STORAGE DEVICE

(71) Applicant: City University of Hong Kong, Kowloon (HK)

(72) Inventors: Chunyi Zhi, Shatin (HK); Qi Yang, Kowloon (HK); Ying Guo, Kowloon (HK); Zijie Tang, Hong Kong (HK)

(73) Assignee: City University of Hong Kong, Kowloon (HK)

( * ) Notice: Subject to any disclaimer, the term of this patent is extended or adjusted under 35 U.S.C. 154(b) by 226 days.

(21) Appl. No.: 16/733,304

(22) Filed: Jan. 3, 2020

(65) Prior Publication Data

US 2021/0210799 A1 Jul. 8, 2021

(51) Int. Cl.
*H01M 10/44* (2006.01)
*H01M 4/38* (2006.01)
*H01M 4/02* (2006.01)

(52) U.S. Cl.
CPC ............. *H01M 10/44* (2013.01); *H01M 4/38* (2013.01); *H01M 2004/021* (2013.01); *H01M 2004/027* (2013.01); *H01M 2300/0002* (2013.01)

(58) Field of Classification Search
CPC .. H01M 10/36; H01M 10/4242; H01M 10/44; H01M 2004/021; H01M 2004/027; H01M 2300/0002; H01M 4/244; H01M 4/38
See application file for complete search history.

(56) References Cited

U.S. PATENT DOCUMENTS

| 3,516,862 A | 6/1970 | Grinten |
| 4,479,856 A | 10/1984 | Ando |
| 2020/0212440 A1* | 7/2020 | Kolhekar ................ H01M 4/50 |

OTHER PUBLICATIONS

L. Kang, M. Cui, F. Jiang, Y. Gao, H. Luo, J. Liu, W. Liang, C. Zhi, "Nanoporous CaCO3 Coatings Enabled Uniform Zn Stripping/Plating for Long-Life Zinc Rechargeable Aqueous Batteries" Advanced Energy Materials, 8 (2018) 1801090.
Y. Zeng, X. Zhang, R. Qin, X. Liu, P. Fang, D. Zheng, Y. Tong, X. Lu, "Dendrite-Free Zinc Deposition Induced by Multifunctional CNT Frameworks for Stable Flexible Zn-Ion Batteries" Advanced Materials, (2019) 1903675.
B.-S. Lee, S. Cui, X. Xing, H. Liu, X. Yue, V. Petrova, H.-D. Lim, R. Chen, P. Liu, "Dendrite Suppression Membranes for Rechargeable Zinc Batteries" ACS Applied Materials & Interfaces, 10 (2018) 38928-38935.

* cited by examiner

*Primary Examiner* — Victoria H Lynch
(74) *Attorney, Agent, or Firm* — Renner Kenner Greive Bobak Taylor & Weber

(57) ABSTRACT

A method for manipulating an energy storage device includes the step of charging and discharging the energy storage device at a first current density for a first period of time, wherein the first current density is lower than a nominal operating current density of the energy storage device; and wherein the step of charging and discharging at the first current density is arranged to smoothen a surface of an anode of the energy storage device.

25 Claims, 22 Drawing Sheets

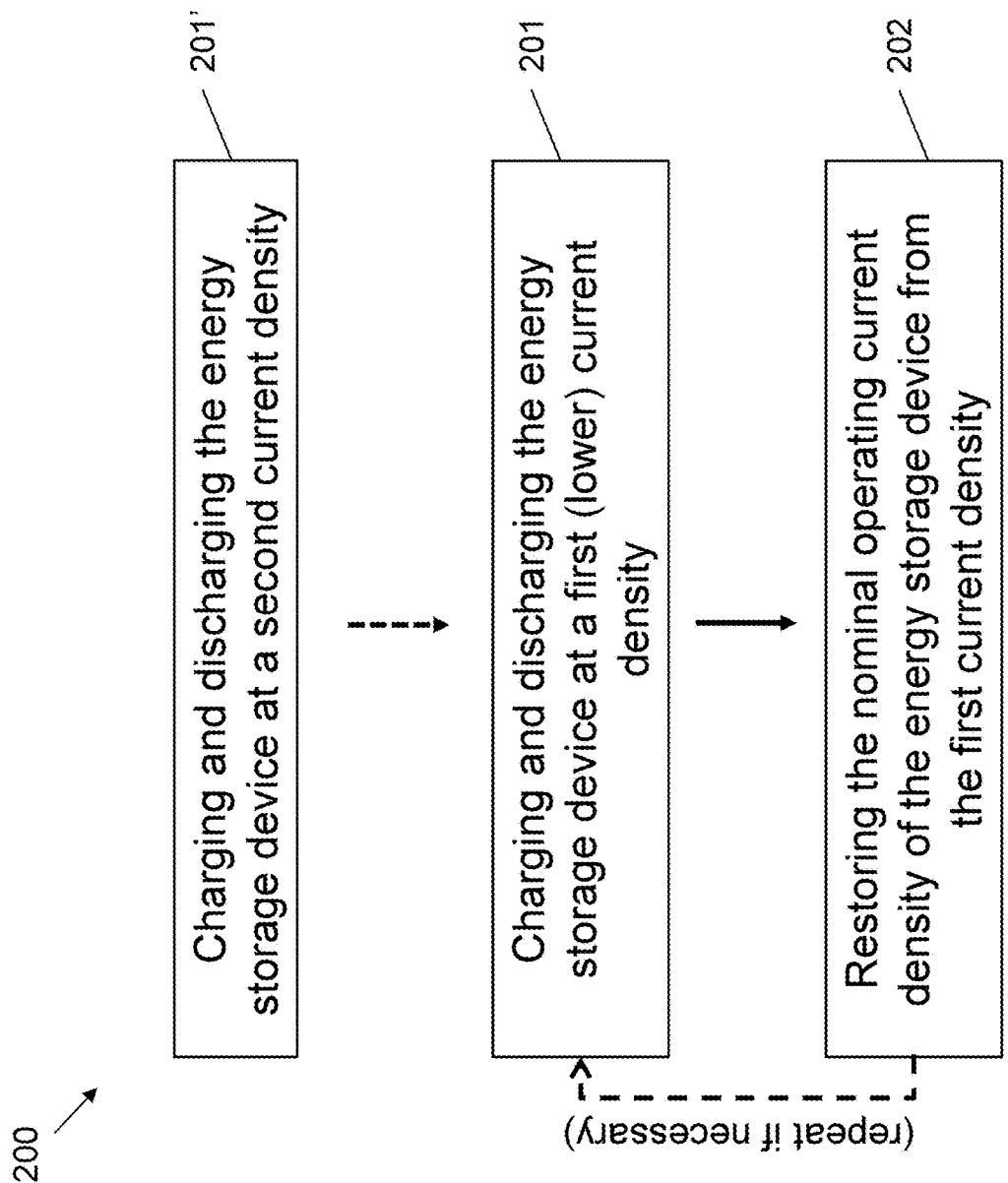

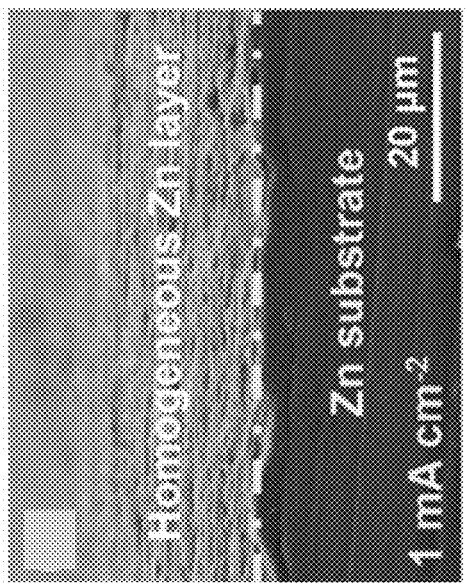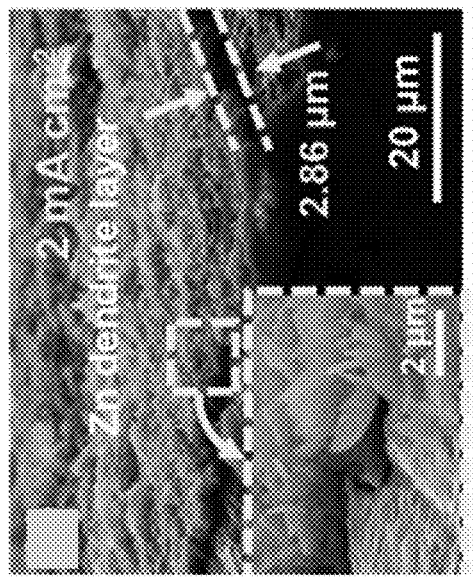
Fig. 6A
Fig. 6B

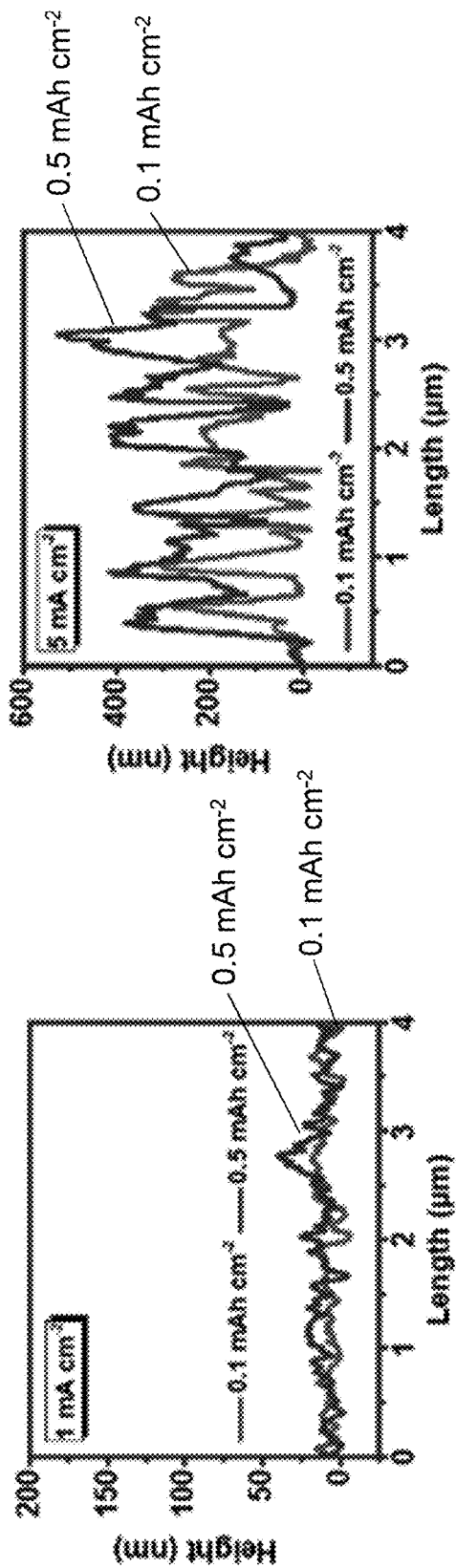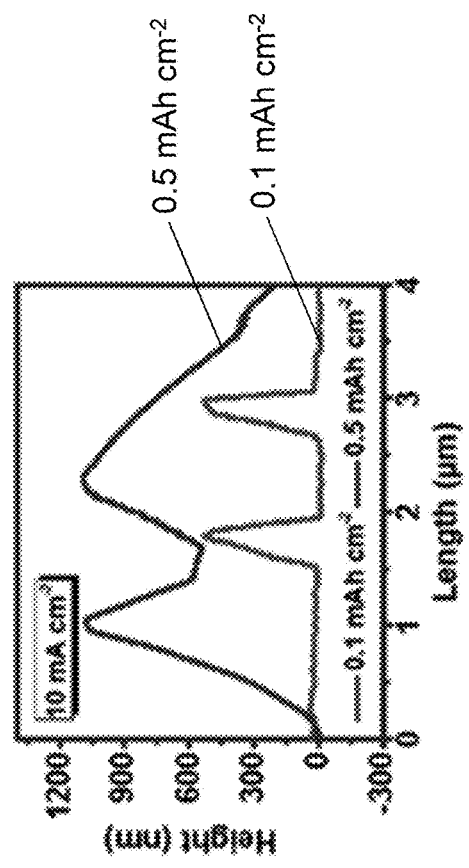
Fig. 13A  Fig. 13B  Fig. 13C

METHOD FOR MANIPULATING AN ENERGY STORAGE DEVICE

TECHNICAL FIELD

The present invention relates to a method for manipulating an energy storage device, in particular, but not exclusively, to a method that can smoothen a surface of an anode of the energy storage device.

BACKGROUND

Batteries are generally inseparable from different electronics (such as printed electronics, wearable electronics, etc.) as well as various vehicles that we used daily. In particular, rechargeable batteries may be used to provide power for the aforesaid applications as they can be charged and discharged for a considerably long period of time, which is advantageous in terms of operational cost and environment sustainability.

During the operation of the battery, the electrodes of the battery may undergo a series of chemical reactions to convert chemical energy into electrical energy or to store energy in form of chemical energy. After a prolong usage of the battery, negative effects arisen from the chemical changes in the internal components, such as deterioration of the electrodes or a depletion of the constituents of the electrolyte, may lead to an unsatisfactory cycling performance.

SUMMARY OF THE INVENTION

In accordance with the first aspect of the present invention, there is provided a method for manipulating an energy storage device, comprising the step of charging and discharging the energy storage device at a first current density for a first period of time, wherein the first current density is lower than a nominal operating current density of the energy storage device; and wherein the step of charging and discharging at the first current density is arranged to smoothen a surface of an anode of the energy storage device.

In an embodiment of the first aspect, the step of charging and discharging at the first current density is arranged to reduce a topographic feature on the surface of the anode.

In an embodiment of the first aspect, the step of charging and discharging at the first current density is arranged to eliminate dendritic structures on the surface of the anode.

In an embodiment of the first aspect, the step of charging and discharging at the first current density involves plating and stripping of an anode material on the surface of the anode, thereby passivating sharp tips on the dendritic structures.

In an embodiment of the first aspect, during the stripping of the anode material on the surface of the anode, the sharp tips on the dendritic structures are stripped such that smooth edges form on the dendritic structures.

In an embodiment of the first aspect, the formation of smooth edges causes a reduction of localized current density on the surface of the anode, thereby suppressing dendritic structures generation.

In an embodiment of the first aspect, the method further comprising the step of initiating a formation of the dendritic structures, prior to the step of charging and discharging the energy storage device at the first current density.

In an embodiment of the first aspect, the initiation of dendritic structures formation is performed by charging and discharging the energy storage device at a second current density for a second period of time.

In an embodiment of the first aspect, the second current density is higher than the nominal operating current density.

In an embodiment of the first aspect, the second current density is equal to the nominal operating current density.

In an embodiment of the first aspect, the method further comprises the step of restoring the nominal operating current density of the energy storage device from the first current density, thereby terminating the manipulation of the device.

In an embodiment of the first aspect, the first current density is about 0.1 to 1 mA $cm^{-2}$.

In an embodiment of the first aspect, the second current density is about 5 to 10 mA $cm^{-2}$.

In an embodiment of the first aspect, the charging and discharging of the energy storage at the first current density lasts for about 3 to 6 h.

In an embodiment of the first aspect, the charging and discharging of the energy storage at the second current density lasts for about 1 to 1.5 h.

In an embodiment of the first aspect, the anode includes zinc.

In an embodiment of the first aspect, the energy storage device includes an aqueous electrolyte selected from at least one of an aqueous solution of zinc sulfate, zinc chloride, zinc acetate, and zinc trifluoromethanesulfonate.

In an embodiment of the first aspect, the aqueous electrolyte is at a concentration of 0.2 to 3 M.

In an embodiment of the first aspect, operation lifetime of the energy storage device is increased by at least 400% after subjecting to the step of charging and discharging at the first current density.

In an embodiment of the first aspect, the device is a rechargeable battery.

BRIEF DESCRIPTION OF THE DRAWINGS

Notwithstanding any other forms which may fall within the scope of the present disclosure, a preferred embodiment will now be described, by way of example only, with reference to the accompanying drawings in which:

FIG. 2B is a flowchart illustrating a process flow of a method in accordance with an embodiment of the present invention.

FIG. 6A is a SEM image showing the cross-section of a Zn electrode of a ZIB being cycled at 1 mA cm$^{-2}$.

FIG. 6B is a SEM image showing the cross-section of a Zn electrode of a ZIB being cycled at 2 mA cm$^{-2}$. The insert shows the details of the tiny yet serried Zn dendrite layer.

FIG. 13A is a plot of height against length showing the height distribution of the topographic features on the Zn electrode surfaces in terms of capacity while the current density is kept constant at 1 mA cm$^{-2}$.

FIG. 13B is a plot of height against length showing the height distribution of the topographic features on the Zn electrode surfaces in terms of capacity while the current density is kept constant at 5 mA cm$^{-2}$.

FIG. 13C is a plot of height against length showing the height distribution of the topographic features on the Zn electrode surfaces in terms of capacity while the current density is kept constant at 10 mA cm$^{-2}$.

DETAILED DESCRIPTION OF THE PREFERRED EMBODIMENTS

Figure 1:
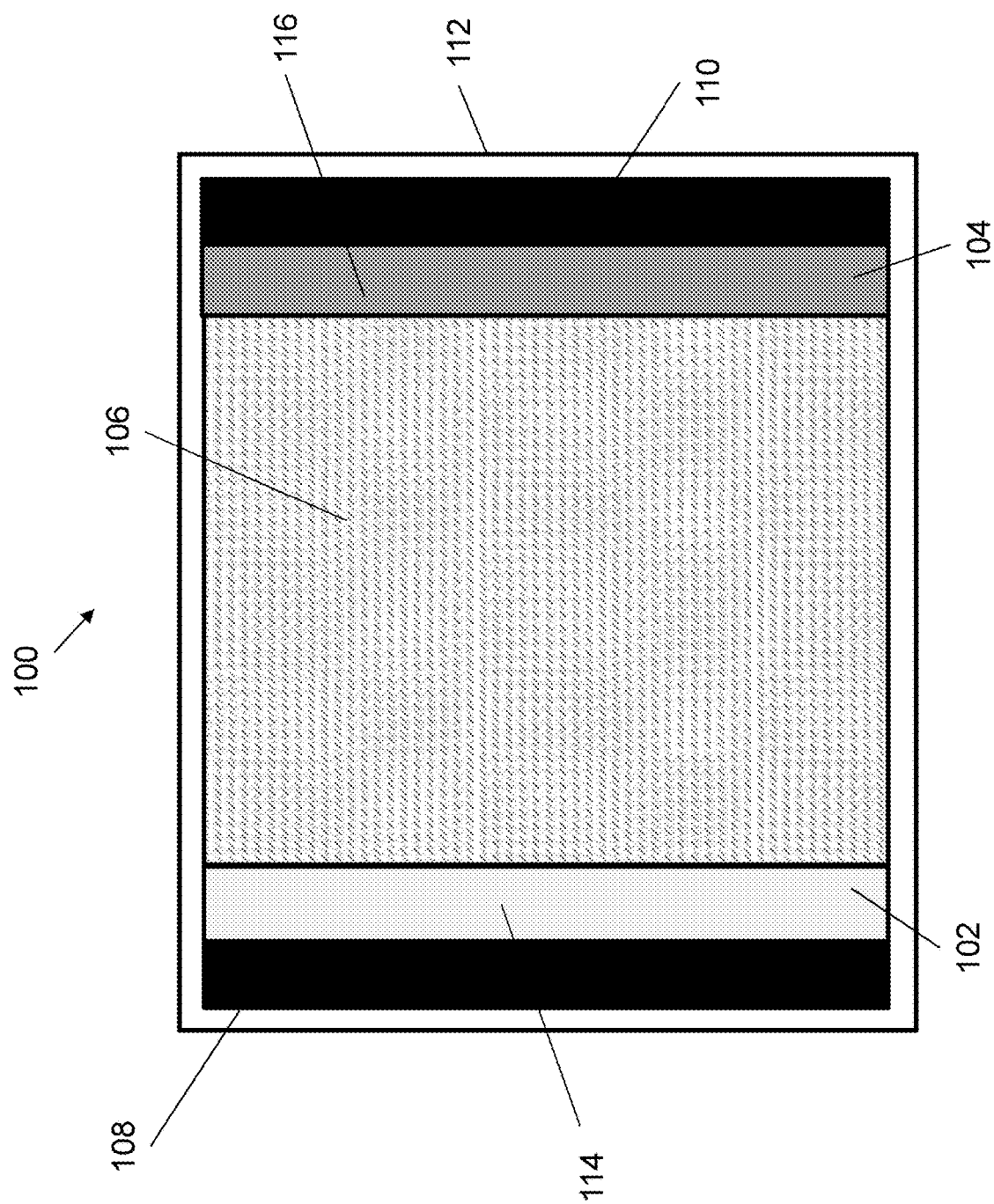
FIG. 1 illustrates an energy storage device in accordance with an embodiment of the present invention.

The inventors have, through their own research, trials and experiments, devised that flexible electronics may be used in a variety of applications in healthcare, military, and other applications. For example, flexible electronics may be used in wearable electronic device components and devices (i.e. wearable electronics), which may include smart fabric materials in the wearable electronics. Preferably, devices including garments made with smart fabrics may be used in a variety of applications such as healthcare to replace bulky instruments and bulky electronic components.

One example of an energy storage device for flexible/wearable electronics is zinc-ion battery (ZIB) which may include advantages such as having much less toxic and flammable materials therein as compared with lithium-ion batteries, therefore may have much less safety and/or health concern to users. ZIB may also be low cost for scaling up as a result of the water-free and/or oxygen-free environment for assembling the battery. In addition, ZIB may have a high specific capacity as a result of multiple electron transfer and a low redox potential of $Zn^{2+}/Zn$.

It is appreciated that cycling performance as well as lifespan of a battery may be correlated to the stability of the anode. In particular, during a charging and discharging cycle, the anode material may be plated onto and stripped from the anode surface repeatedly, which may render the anode surface roughened. Such a roughened surface may eventually drive a formation and/or a growth of dendritic structures on the anode surface. Particularly, the dendritic structures may grow to an extent reaching the cathode of the battery as the cycling process continues, leading to a short circuit in the battery.

The inventors have devised that there are some reported strategies that may be capable of tackling with the aforesaid issue, including, for example, structural design of the battery by matching the anode with various cathode materials as well as modifying the constituents of the electrolyte. However, all these measures are considered as "passive" measures. That is, those measures are designed to "prevent" the formation of the dendritic structures of a brand-new battery rather than remove or eliminate any already-formed dendritic structures within a battery that is in service. Thus, it is appreciated that once the active material that is arranged to protect/prevent the anode from forming the dendritic structures is depleted, the dendritic structures may still form and/or grow on the anode surface and the battery may have to be abandoned once internal short circuit occurs as a result of the protection failure. Alternatively, it may require a skilled person who has specific technical knowledge to dissemble the battery to replace the components, which would be at a high cost and highly inefficient.

Accordingly, it may be preferable to provide a method that can smoothen the surface of the anode of an in-service battery so as to address the above issues. In particular, the inventors have, through their own research, trials, and experiments devised that by manipulating the charging and discharging parameters of an energy storage device, such as the current density of a charging and discharging cycle, it may "actively" eliminate any already-formed dendritic structures without dissembling the battery; and such manipulation may further prolong the lifespan of the battery by at least 400%.

With reference to FIG. 1, there is provided an exemplary example of an energy storage device 100 that may have undergone a series of charging and discharging cycles at a nominal operating current density for a certain period of time. The device 100 may be of any form that can capture energy produced at one time for use at a later time. In this example, the energy storage device is a battery, in particular a rechargeable battery. The battery 100 may be of any suitable form that fits a particular application, such as flat-shaped, fiber-shaped, twisted fiber-shaped, coin-shaped, ball-shaped etc. Regardless of the shape of the battery, the battery may substantially have a stable and/or long-lasting cycling performance after subjecting to the method discussed in the later part of this disclosure.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

The invention consists in the foregoing and also envisages constructions of which the following gives examples only. In the following description like numbers denote like features.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

In this embodiment, the battery 100 comprises an electrode 102 and an electrode 104 being spaced apart from each other and an electrolyte 106 disposed between the electrodes 102, 104. The electrolyte 106 is sandwiched between and is electrically coupled with the electrodes 102, 104. The electrodes 102, 104 may function as an anode and a cathode, respectively or vice versa.

Optionally or additionally, the battery 100 may also include substrates 108, 110 which may provide mechanical supports to the electrode 102 and/or the electrode 104. The substrates may also operate as a current collector to associate with the electrodes 102, 104, respectively. For example, the substrates may be electrically conductive and may be bonded to external electrical wires to deliver electrical energy to external electronic devices.

The battery 100 may optionally include an encapsulation 112 that receives and encases the electrodes 102, 104 and the electrolyte 106. The encapsulation 112 may be formed in any suitable shape such as a cylinder or a planar shape or any other suitable shape. The encapsulation 112 may be formed from a suitable material such as epoxy or a polymer.

In one example embodiment, the electrode 102 functions as an anode and the electrode 104 functions as a cathode of the battery 100. In operation there is a charge transfer between the anode 102 and the cathode 104 in order to convert chemical energy to electrical energy. The anode 102 and the cathode 104 are preferably being flexible. The anode 102 and cathode 104 are arranged in a suitable arrangement depending on the desired shape of the battery 100.

Referring to FIG. 1, the anode 102 comprises a substrate 108 with a metal or metal compound 114 disposed on the substrate 108. The substrate 108 may be of any suitable material. For example, the substrate 108 may be selected from carbon nanotube (CNT) paper, carbon paper, nickel foam or steel sheet. The substrate 108 may have some electrical conductance but is preferably robust enough to function within an electrolyte.

The anode 102 preferably comprises zinc. In one example, the anode may be a zinc slurry 114 coated on the substrate 108 selected from, for instance, carbon nanotube (CNT) paper, carbon cloth, carbon paper, nickel foam or steel sheet. The zinc slurry may be a mixture of zinc powder, acetylene black, and polyvinylidene at a weight ratio of, for example, 7:2:1, and a dispersing agent such as N-methyl-2-pyrrolidone. The substrate 108 may provide a base layer for the zinc slurry to be coated thereonto. The zinc slurry is coated to form a substantially thick layer of zinc 114. The thickness of the zinc layer may depend on the operational life of the battery 100. In this example, the thickness of the zinc layer 114 may be of 30-200 µm.

Alternatively the anode 102 may comprise a ribbon or a sheet of zinc metal. That is, the anode 102 may not include an additional substrate 108 and may include a piece of zinc metal. The zinc metal may be a flexible ribbon or a flexible sheet of zinc metal. The zinc metal is arranged in a suitable configuration based on the desired shape of the battery 100.

The cathode 104 may have a similar configuration as the anode 102. That is, the cathode 104 may have a metal or a metal compound 116 alone or may have a metal or a slurry of the metal 116 deposited on a substrate 110, which may be selected from carbon nanotube (CNT) paper, carbon cloth, carbon paper, nickel foam or steel sheet. The cathode 104 preferably comprises zinc. In one example, the cathode may be a zinc slurry 116 coated on the substrate 110. Similarly, the substrate 110 provides a base layer for the zinc slurry 116 to be coated thereonto. The zinc slurry is coated to form a substantially thick layer of zinc 116. The thickness of the zinc layer may depend on the operational life of the battery 100.

Alternatively, the cathode 104 may comprise a ribbon or a sheet of zinc metal. That is, similar to the anode 102, the cathode 104 may not include an additional substrate 110 and may include a ribbon or a sheet of zinc metal that may be particularly of certain flexibility. The zinc metal is arranged in a suitable configuration based on the desired shape of the battery 100.

The electrolyte 106 may be an aqueous electrolyte being disposed/contained in the encapsulation 112 and the anode 102 and the cathode 104 are positioned within the electrolyte. The electrolyte may ionically connect the anode and the cathode thereby allowing a charge transfer therebetween during the charging and discharging cycle(s).

Preferably, the electrolyte 106 may include an aqueous solution of neutral or mild-acid salt. For example, the electrolyte 106 may include an aqueous solution of at least one of zinc sulfate, zinc chloride, zinc acetate, and zinc trifluoromethanesulfonate. The metal salt may enhance the conductivity of the electrolyte during the operation. The salt may be of a particular concentration depending on one's needs. In this example, the concentration of the salt may be 0.2 to 3 M. It is appreciated that a skilled person may recognize any other electrolytic solutions including suitable salts or ions according to their needs.

The electrolyte may additionally include a separator (not shown). The separator may be positioned between the anode 102 and the cathode 104 such that the electrodes are kept apart to prevent short circuit. The separator may be a film or a membrane being made of any material that allows ion transportation between the anode and the cathode. For example, the separator may be made of non-woven fibre, glass fibre, or polypropylene.

In the operation of charging and discharging cycle, it is appreciated that the anode 102/metal 114 and the cathode 104/metal 116 may respectively undergo a series of chemical reactions to convert chemical energy into electrical energy or convert vice versa during the discharging and charging processes. During the discharging process, the cathode may undergo a reduction reaction(s) by gaining electron(s) at the expense of the anode. Meanwhile, the anode may be stripped through an oxidation reaction(s) to provide an electron(s) to the cathode, and therefore there is a current flow within the battery. In contrast, during the charging process, the cathode may undergo an oxidation reaction(s) to store charges from an external source whereas the anode may be restored through a reduction reaction(s) of which the stripped anode material may be plated back to the anode.

Figure 2A:
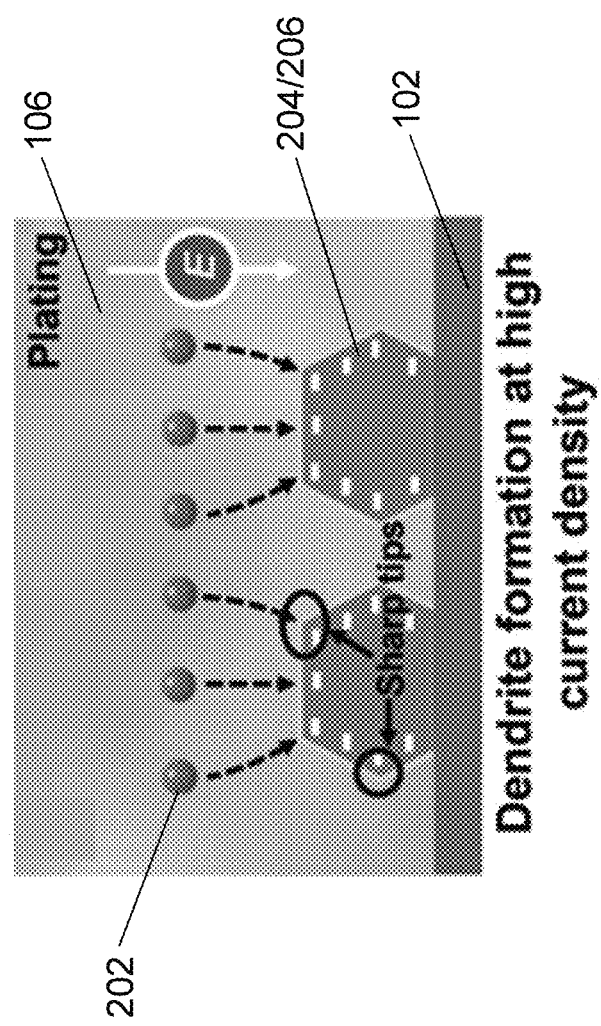
FIG. 2A illustrates the electrochemical processes that may occur on the anode of the energy storage device of FIG. 1 during an operation of charging.

With reference to FIG. 2A, there is provided a schematic diagram illustrating the electrochemical processes that may occur at the anode 102 during an operation of charging cycle. In this example, the charging operation is carried out in an aqueous electrolyte 106. During the charging process, metal ions 202 (i.e. the material of the anode), which are stripped from the anode, particularly from the surface of the anode, during the discharging cycle may approach to the anode surface to receive electron(s) from an external power source connecting to the battery, so as to be plated back to the anode by undergoing a reduction reaction.

Yet, owing to the repeated stripping-deposition reactions at the anode, the surface of the anode may become roughened. A plurality of topographic features 204 such as raised surface heterogeneities, screw dislocations, etc. may be formed on the surface of the anode. As a result, a positively sloped concentration gradient of electrical charges as a function of distance from the anode surface may be established.

For example, during or after a charging process, anode material is deposited on the surface of the anode 102, and topographic features 204 such as a number of (half-)hexagonal crystal structure are formed on a surface of the anode. These topographic features include a plurality of sharp tips on the edges. Electrical charges may therefore concentrate on those tips, causing the metal ions 202 more preferentially to be plated at those tips in a subsequent charging process.

Such situation may become more serious when the charging and discharging are operated with a high current density such as 5 mA cm$^{-2}$ or higher since there may be even more charges localized at the sharp tips of the features 204, attracting even more metal ions 202 to be plated on those tips; or alternatively when the battery has a high capacity (i.e. a battery with a large cathodic loading mass), it may take more time to complete a single-time charging process as compared with a battery with a lower capacity under the same current density, which may facilitate the formation of a rough anode surface thereby facilitating the formation of the topographic features 204. As this process (i.e. the plating of metal ions on the sharp tips of the topographic features) continues, the topographic features 204 may eventually give rise to dendritic structures 206.

To overcome the aforesaid issues, the inventors have, through their own research, trials, and experiments, devised that by manipulating the current density for the charging and discharging of the energy storage device, the surface of the anode may be smoothened, which may substantially lead to a stable and prolonged cycling performance of the battery.

With reference to FIG. 2B, there is provided a method 200 for manipulating an energy storage device. The method may comprise the step of charging and discharging the energy storage device at a first current density for a first period of time. Preferably, in the step of charging and discharging at the first current density, a surface of an anode of the device may be smoothened.

The method 200 may be commenced at step 201. In this step, the energy storage device/battery 100 may be charged and discharged at a first current that is lower than a nominal operating current density of the device.

Figure 2C:
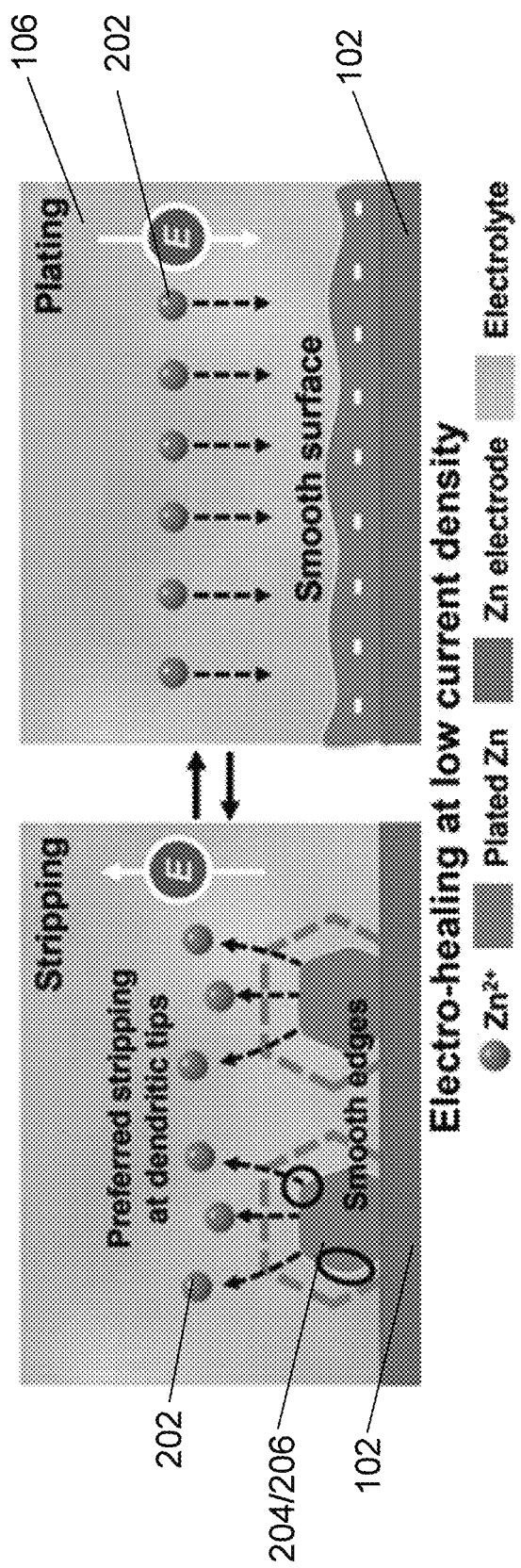
FIG. 2C illustrates the electrochemical processes that may occur on the anode of the energy storage device of FIG. 1 when being subjected to a particular step of the method of FIG. 2B.

For example, referring to FIG. 2C, as mentioned, a plurality of topographic features 204 may be formed on the surface of the anode 102 during the charging and discharging process and may eventually give rise the dendritic structures 206. With the operation of charging and discharging cycles at the first current density, such as about 0.1 to 1 mA cm$^{-2}$, the sharp tips of the dendritic structures 206 may be stripped more readily to become metal ions 202 as compared with other regions on the surface of the anode. In this way, the sharp tips may be passivated and becoming smooth edges as a consequence.

By charging and discharging the device at such current density (i.e. the first current density) for a certain period of time, the topographic feature(s) on the surface of the anode may be reduced as a result of a change of plating and stripping behavior on the surface of the anode.

The formation of smooth edges may be advantageous in suppressing the dendritic structures generation since those smooth edges may restrict the mutation of the localized electric field, rendering a more uniform electrical charge distribution on the anode surface. In other words, the electrical charges may be much less localized (i.e. less concentrated) or no longer localized on the dendritic structures, thereby the metal ions 202 may be more readily plated on other regions of the anode surface rather than on the dendritic structures during the plating process. As a result, after a predefined period of time, such as 3 to 6 h, the dendritic structures may be substantially removed and the surface of the anode may be smoothened (FIG. 2C).

After performing step 201, the method 200 may be ended at step 202, where the operating current density of the energy storage device may be resumed to the nominal operating current density from the first current density (FIG. 2B).

The method 200 may be particularly useful to increase a lifespan (i.e. operation lifetime) of an in-service energy storage device that may already have topographic features 204 and/or dendritic structures 206 formed on the surface of the anode when implementing the method 200 at step 201. Alternatively, the method 200 may be further applied to a brand-new energy storage device (i.e. an energy storage device that has not been used (e.g. just being manufactured from a factory) or does not have any topographic features 204 and/or dendritic structures 206 formed yet). The inventors unexpectedly devised that the lifespan of a brand-new energy storage device may be prolonged by performing step 201' prior to the step 201 of the method 200.

In step 201', a second current density may be applied to the energy storage device to initiate a formation of the dendritic structures. Preferably, the second current density may be higher than or equal to the nominal current density of the energy storage device. By charging the energy storage device using a relatively high current density for a short period of time, topographic features 204 may be formed in a controlled manner, and therefore the improving the effect og the subsequent smoothening process.

For example, the second current density may be a high current density of 5 to 10 mA cm$^{-2}$. As mentioned, under a high current density, it may facilitate the formation of topographic features and/or dendritic structures on the surface of the anode as more charges may be localized at the sharp tips of the features, attracting even more stripped metal ions to be plated on those tips. Thus, after a certain period of time, such as about 1 to 1.5 h, a plurality of topographic features and/or dendritic structures with sharp tips may be formed (FIG. 2A). After the formation of the dendritic structures, the method 200 may be proceeded to and completed with steps 201 and 202 as mentioned above. As such, the anode surface of the brand-new energy storage device may be smoothened.

Optionally, step 201 or the smoothening process may be performed periodically so as to "heal" the energy storage device to improve the condition of the anode surface after the device operates with a predetermined number of charging/discharging cycles, so as to improve the performance and/or the health of the energy storage device.

It is appreciated that the method of the present disclosure may be applied to different metal battery systems. Without limited by the following examples, the battery systems may include zinc-ion battery, lithium-ion battery, lead-acid battery and the like. In one example, the method 200 may be applied to the using/manipulating a zinc-ion battery. The characterization and the electrochemical performance of the zinc-ion battery before and after subjecting to the method 200 will now be discussed.

In this experiment, a symmetric coin-type zinc-ion battery (ZIB) was initially synthesized to investigate the effect of current density on Zn dendrite behavior in neutral/mild electrolyte. In particular, the effect was evaluated in terms of cycling lifespan, polarization at redox platform, and overall voltage hysteresis of the battery.

Figure 3A:
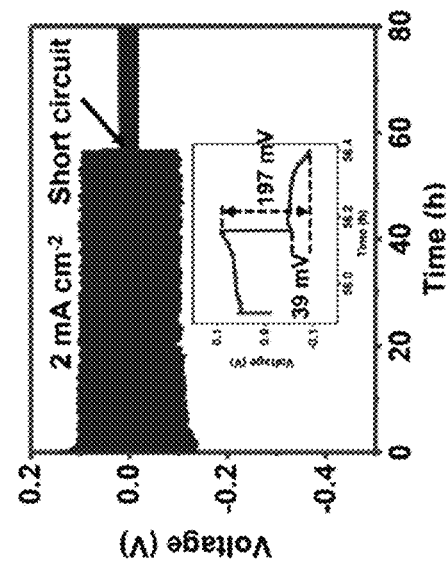
FIG. 3A is a plot of voltage against time showing the cycling performance of a zinc-ion battery (ZIB) being operated at a current density of 1 mA $cm^{-2}$. The insert is a magnified profile of FIG. 3A showing the profile of the ZIB at the last cycle before the occurrence of short circuit with labelling the voltage hysteresis and the polarization potential of the discharging platform.
Figure 3B:
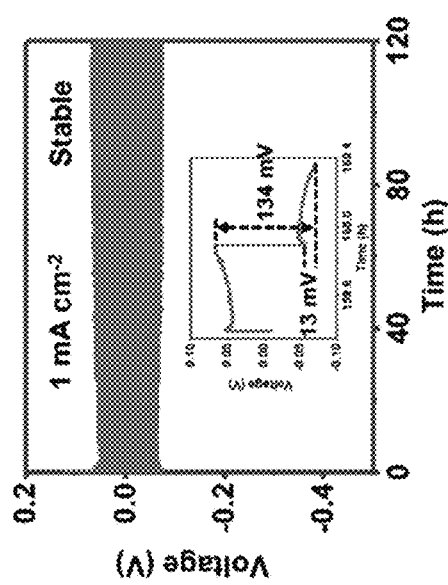
FIG. 3B is a plot of voltage against time showing the cycling performance of a zinc-ion battery (ZIB) being operated at a current density of 2 mA $cm^{-2}$. The insert is a magnified profile of FIG. 3B showing the profile of the ZIB at the last cycle before the occurrence of short circuit with labelling the voltage hysteresis and the polarization potential of the discharging platform.
Figure 3C:
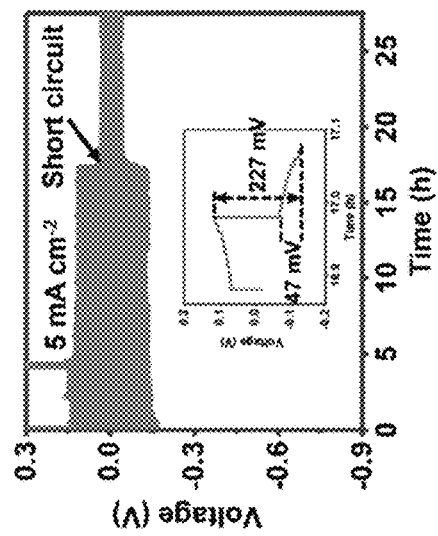
FIG. 3C is a plot of voltage against time showing the cycling performance of a zinc-ion battery (ZIB) being operated at a current density of 5 mA cm$^{-2}$. The insert is a magnified profile of FIG. 3C showing the profile of the ZIB at the last cycle before the occurrence of short circuit with labelling the voltage hysteresis and the polarization potential of the discharging platform.
Figure 3E:
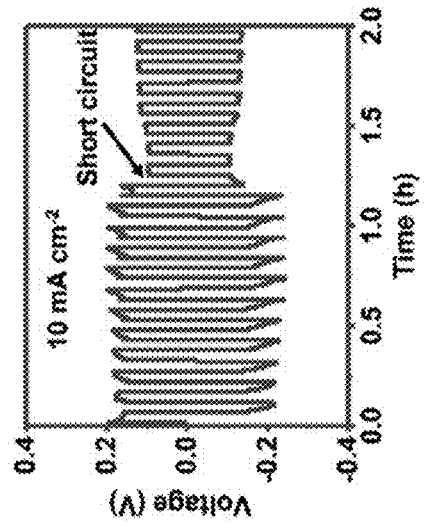
FIG. 3E is a plot of voltage against time showing the cycling performance of a zinc-ion battery (ZIB) being operated at a current density of 10 mA cm$^{-2}$.
Figure 3D:
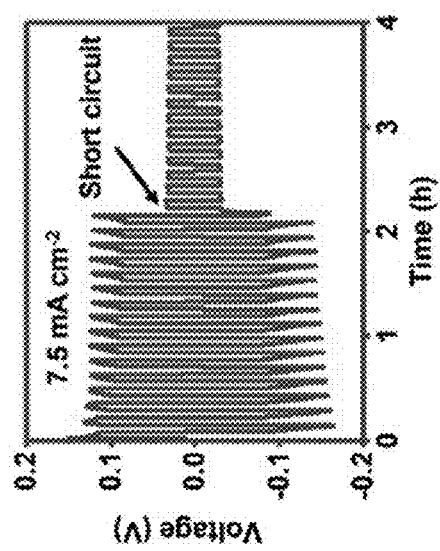
FIG. 3D is a plot of voltage against time showing the cycling performance of a zinc-ion battery (ZIB) being operated at a current density of 7.5 mA cm$^{-2}$.

The ZIB was assembled by sandwiching a non-woven fibrous membrane between two Zn plates in $ZnSO_4$ electrolyte. Voltage-time curves as shown in FIGS. 3A to 3C demonstrated that the symmetric ZIB exhibited a stable Zn plating/stripping process and a long lifespan of 120 h at 1 mA cm$^{-2}$ (FIG. 3A), while the lifespan gradually decayed to 56 and 17 h at higher current densities of 2 and 5 mA cm$^{-2}$ respectively (FIGS. 3B and 3C). This decayed cycling performance may be attributed to the internal short-circuit as symbolized by the sharp deterioration of voltage hysteresis (the inserts of FIGS. 3A to 3C). Even worse, the lifespan of the ZIB further decreased to ca. 2.1 and 1.2 h when the operating current density was elevated to 7.5 and 10 mA cm$^{-2}$, respectively (FIGS. 3D and 3E).

Figure 3F:
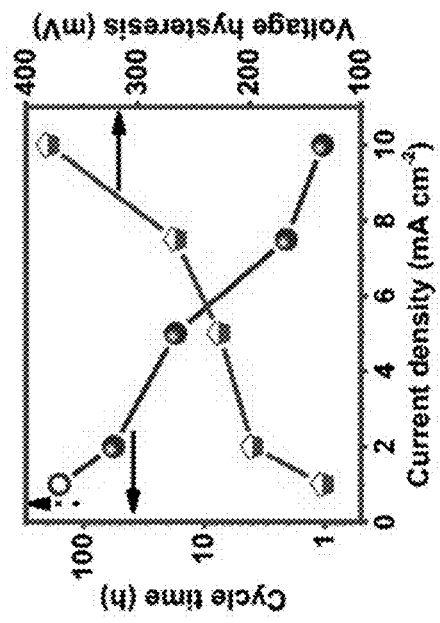
FIG. 3F is a statistical graph showing the cycling time and voltage hysteresis of the ZIBs over different current densities. The hollow circle in the graph represents that the ZIBs was still working after being cycled at 1 mA cm$^{-2}$ for 120 h while no short circuit occurred.

This apparent negative relationship between the lifespan and current density may reflect the deteriorative Zn plating/stripping behavior at high current densities which may be as a result of the formation and inundation of Zn dendrite (FIG. 3F), while it might not be an issue when the battery is operated at a small current density, such as 1 mA cm$^{-2}$ (FIG. 3A). In addition, as reflected by the enlarged voltage-time curves shown in the inserts of FIGS. 3A to 3C, there was also a remarkable expansion of polarization at the discharging platform from 13 to 65 mV with enlarging the current densities, especially at the initial stage of 1-2 mA cm$^{-2}$. This may further confirm the appearance and deterioration of the unstable Zn plating/stripping.

Besides, the overall voltage hysteresis also underwent a dramatic rise of 284% (from 134 mV at 1 mA cm$^{-2}$ to 380 mV at 10 mA cm$^{-2}$). This inflated voltage hysteresis derived from the sluggish diffusion kinetics of Zn$^{2+}$, from the bulk electrolyte to the helmholtz layer and the solid-liquid interface, than that of electron in the Zn anode. Once magnifying the current densities, the local charge density will definitely increase and thus intensifying the voltage hysteresis, resulting in the inhomogeneous plating of Zn.

Figure 4A:
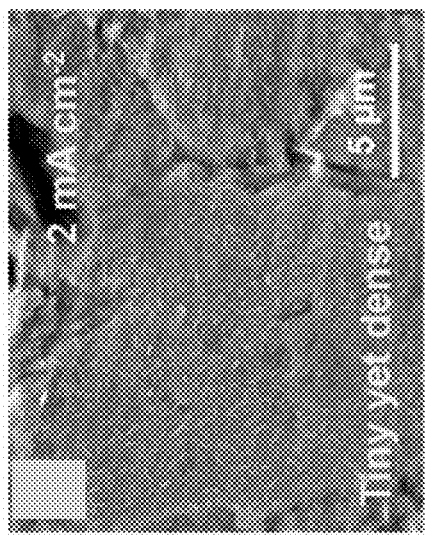
FIG. 4A is a SEM image showing the top view of a Zn electrode of a ZIB being cycled at 1 mA cm$^{-2}$.
Figure 4B:
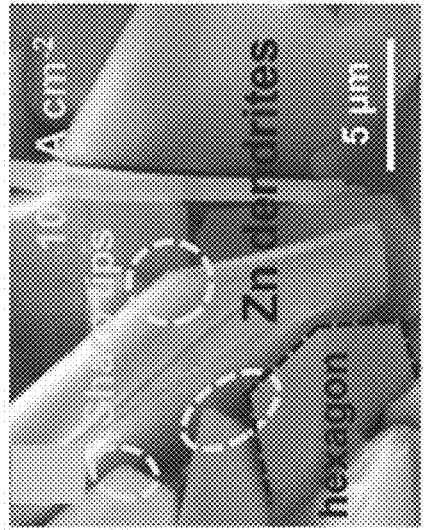
FIG. 4B is a SEM image showing the top view of a Zn electrode of a ZIB being cycled at 2 mA cm$^{-2}$.

The severely decayed lifespan at large current density was resorted to morphological analysis. SEM was applied to investigate the morphology evolution of Zn plated at various current densities of 1-10 mA cm$^{-2}$ from the top-view perspective. As shown in FIG. 4A, the Zn deposited at 1 mA cm$^{-2}$ showed a homogeneous distribution at the reactive side. When the operating current density was elevated to 2 mA cm$^{-2}$, a large amount of tiny yet dense Zn flakes formed at the Zn substrate (FIG. 4B). This remarkable morphology variation well illustrates the dramatic increase of polarization potential at the redox platform of Zn plating.

Figure 4C:
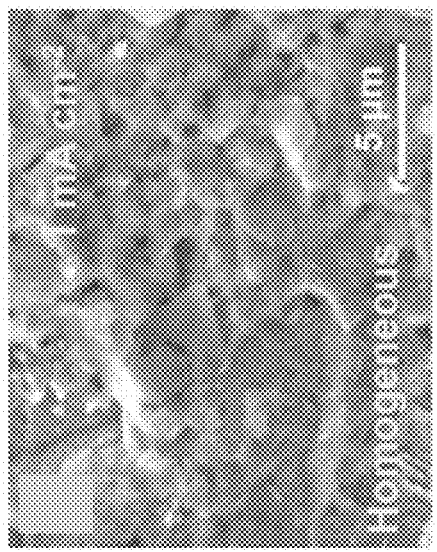
FIG. 4C is a SEM image showing the top view of a Zn electrode of a ZIB being cycled at 7.5 mA cm$^{-2}$.
Figure 4D:
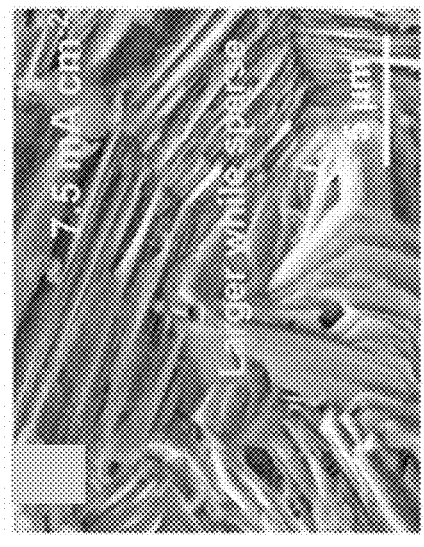
FIG. 4D is a SEM image showing the top view of a Zn electrode of a ZIB being cycled at 10 mA cm$^{-2}$.

At 5 mA cm$^{-2}$, there was an ongoing growth of the Zn flakes which are vertical to the electrode-separator interface. When the current density was raised to 7.5 mA cm$^{-2}$, the edge size of the Zn flanks was increased while the number of the Zn flakes was decreased (FIG. 4C). Finally, when the Zn was deposited at 10 mA cm$^{-2}$, the Zn flakes appeared to be regular hexagon with sharp tips thereon (FIG. 4D). These Zn flakes generated from the inhomogeneous deposition at large current densities may eventually trigger internal short-circuit. That is, these sharp-tip and vertically-distributing Zn flakes with hexagonal topology are Zn dendrites that may lead to internal short-circuit of the battery.

In view of the SEM images as shown in FIGS. 4C and 4D, it appears that the dendrites formed in the neutral electrolyte are different from those formed in the alkaline electrolyte, which may have a moss-like structure consisting of nano-cones. This may be attributed to a different formation mechanism between these two kinds of dendrites.

Figure 5A:
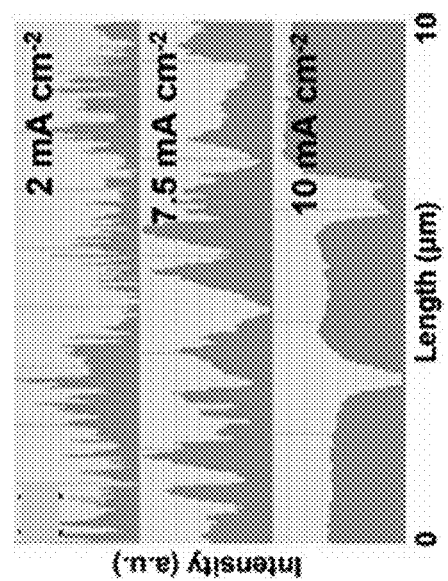
FIG. 5A is a statistical graph showing the quantity statistics of Zn dendrites at various current densities.
Figure 5B:
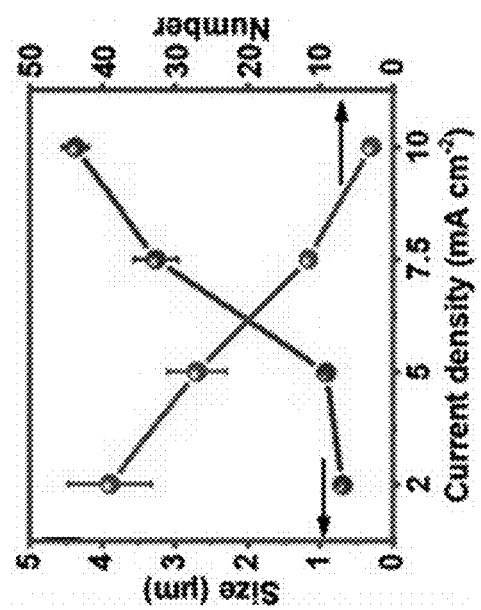
FIG. 5B is a statistical graph showing the edge size and number of Zn dendrites counted as a function of current density.

The number of Zn dendrites and the edge size thereof were determined. In particular, the number of Zn dendrites was calculated according to the average amount along a 10 μm line using DigitalMicrograph. As shown in FIGS. 5A and 5B, the edge size of the neutral Zn dendrite was significantly increased from ca. 0.69 to 4.37 μm at magnified current densities of 2-10 mA cm$^{-2}$ while the number of the zinc dendrites decreased correspondingly from ca. 39 to 3. X-ray diffraction (XRD) patterns revealed that the chemical composition of the neutral dendrites is metallic Zn while that of the alkaline dendrite is ZnO. Thus, without the participation of oxygen, the neutral dendrites may be reduced or even eliminated by manipulating the plating/stripping processes.

Figure 6D:
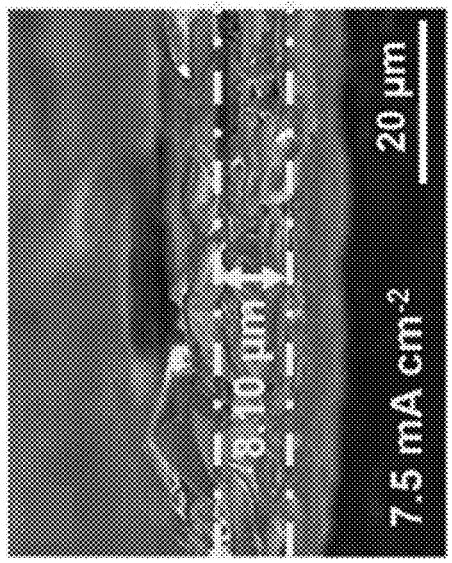
FIG. 6D is a SEM image showing the cross-section of a Zn electrode of a ZIB being cycled at 7.5 mA cm$^{-2}$.
Figure 6E:
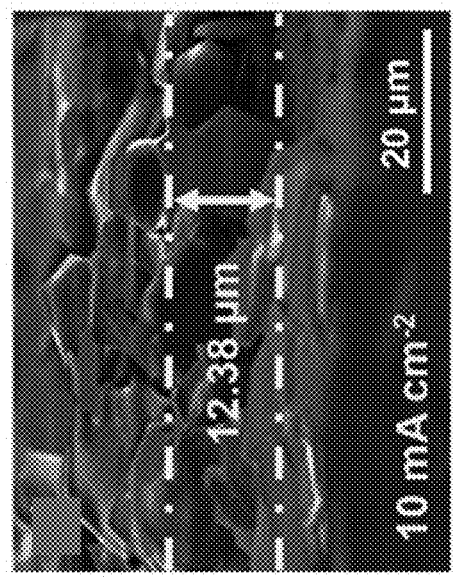
FIG. 6E is a SEM image showing the cross-section of a Zn electrode of a ZIB being cycled at 10 mA cm$^{-2}$.
Figure 6C:
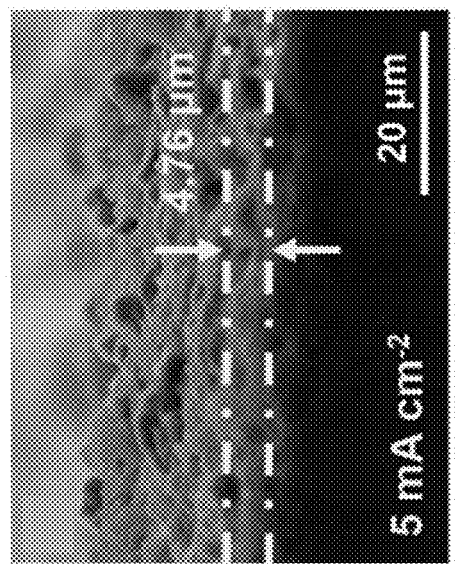
FIG. 6C is a SEM image showing the cross-section of a Zn electrode of a ZIB being cycled at 5 mA cm$^{-2}$.
Figure 7:
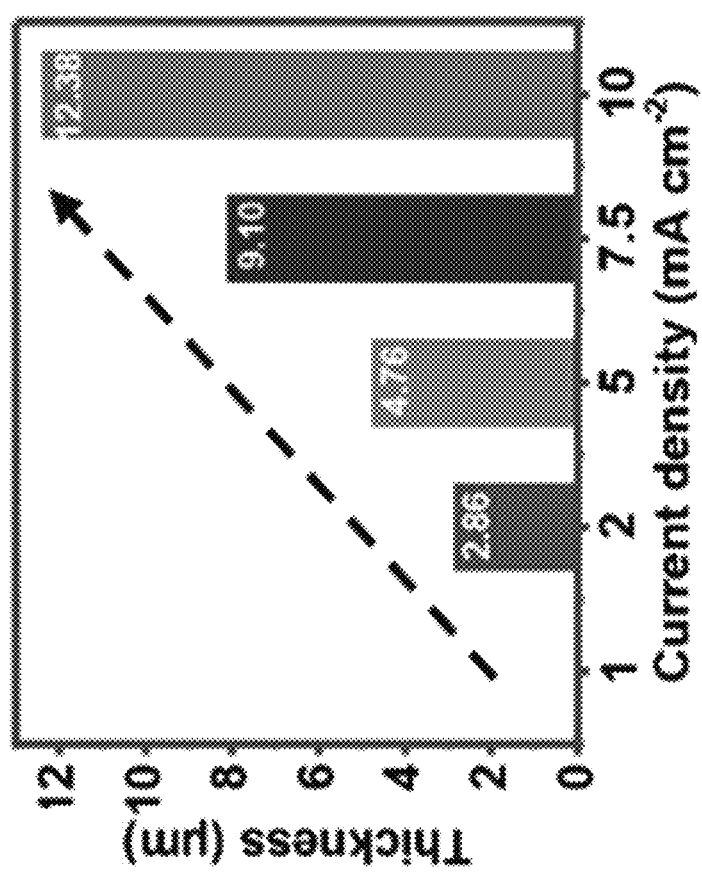
FIG. 7 is a bar chart showing an increasing trend of the thickness of the Zn electrodes of FIGS. 6A to 6E over different current densities.

Cross-section SEM image of the zinc anode recorded at 1 mA cm$^{-2}$ showed a smooth surface of Zn electrode with an approximately unchanged thickness (FIG. 6A). When increasing the current density from 2 to 10 mA cm$^{-2}$, however, it is obvious that dendrite layers were vertically formed on the Zn substrate (FIGS. 6B to 6E). In particular, it was found that the thickness of the dendrite layer was increased from 2.86 to 12.38 μm as the current density increased from 2 to 10 mA cm$^{-2}$ (FIG. 7). Such large dendrites may account for the internal short-circuit occurred at high current densities as a larger dendrite may pierce through the separator more easily, rendering a shorter lifespan of the ZIB when being operated at higher current densities.

Figure 8A:
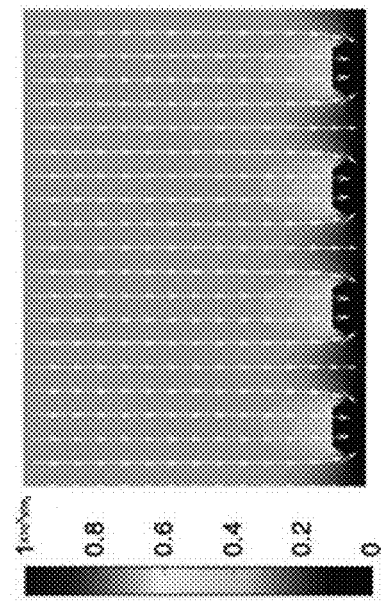
FIG. 8A is a graph showing a simulation of electric field on a surface of a Zn electrode after the first charging process with 0.1 mAh cm$^{-2}$ at a current density of 1 mA cm$^{-2}$.
Figure 8B:
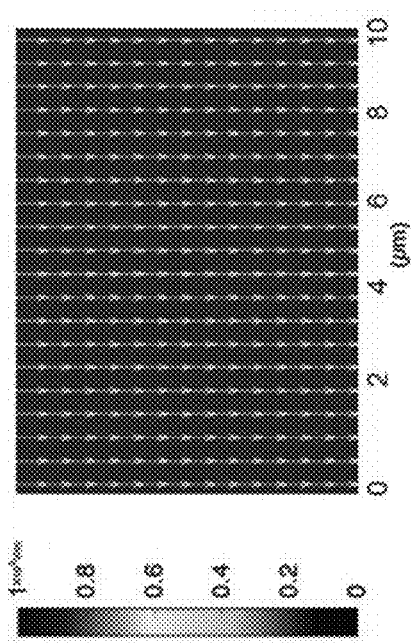
FIG. 8B is a graph showing a simulation of electric field on a surface of a Zn electrode after the first charging process with 0.1 mAh cm$^{-2}$ at a current density of 5 mA cm$^{-2}$.
Figure 8C:
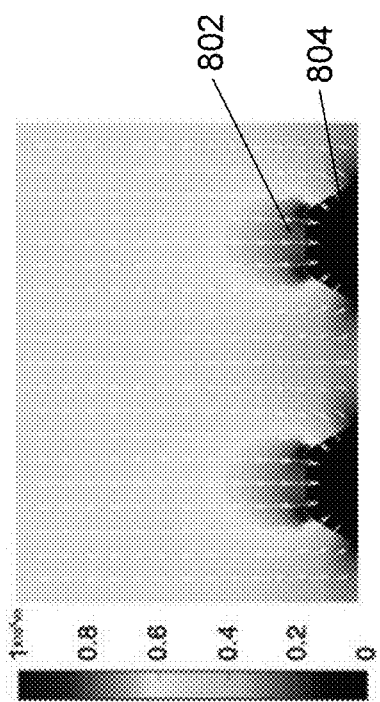
FIG. 8C is a graph showing a simulation of electric field on a surface of a Zn electrode after the first charging process with 0.1 mAh cm$^{-2}$ at a current density of 10 mA cm$^{-2}$.

Distribution of electric field on the Zn anodes and their near spatial were simulated using the finite difference method with the intensity and direction represented by colors and arrows, respectively (FIGS. 8A to 8C). As shown, the distribution of electric field was significantly inhomogeneous at 5 and 10 mA cm$^{-2}$ (FIGS. 8B and 8C) while the distribution was uniform at 1 mA cm$^{-2}$ (FIG. 8A). Furthermore, the intensity of electric field at the dendritic sites, especially at the sharp tips (e.g. 802), was much larger than that on the electrode substrates (e.g. 804). The intensity of electric field and its discrete distribution may determine the priority of Zn deposition on the electrode surface. This simulation results therefore well illustrated that the Zn was homogeneously deposited on the electrode surface at small current densities while apparent dendrite formation was occurred at large current densities.

The formation mechanism of the Zn dendrite in neutral/mild electrolyte was further resorted to atomic force microscope (AFM) with a specific perspective towards dendritic nucleation and growth. Typically, the newly assembled symmetric ZBs were charged at three different current densities with a low capacity of 0.1 mAh cm$^{-2}$ to investigate the nucleation behavior of Zn dendrite at the very initial stage.

Figure 9A:
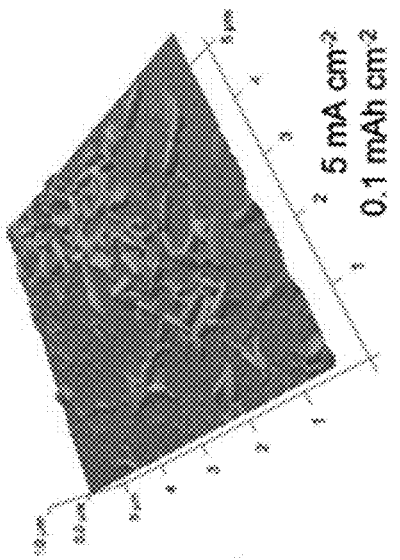
FIG. 9A is an AFM image of a Zn electrode of a ZIB after being cycled with a constant capacity of 0.1 mAh cm$^{-2}$ at a current density of 1 mA cm$^{-2}$. The AFM image shows the nucleation behavior of Zn dendrite at the initial stage.
Figure 9B:
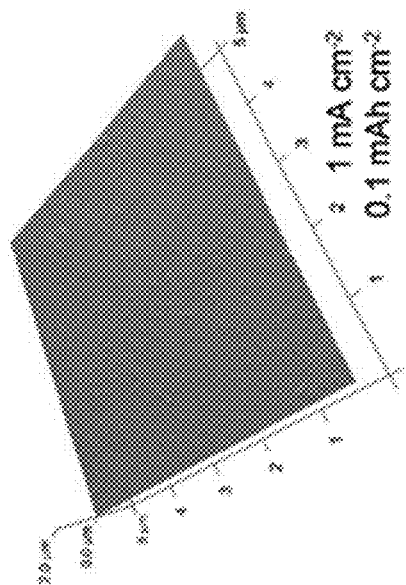
FIG. 9B is an AFM image of a Zn electrode of a ZIB after being cycled with a constant capacity of 0.1 mAh cm$^{-2}$ at a current density of 5 mA cm$^{-2}$. The AFM image shows the nucleation behavior of Zn dendrite at the initial stage.
Figure 9C:
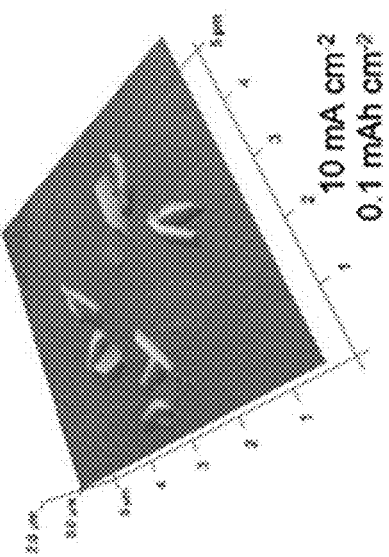
FIG. 9C is an AFM image of a Zn electrode of a ZIB after being cycled with a constant capacity of 0.1 mAh cm$^{-2}$ at a current density of 10 mA cm$^{-2}$. The AFM image shows the nucleation behavior of Zn dendrite at the initial stage.
Figure 10:
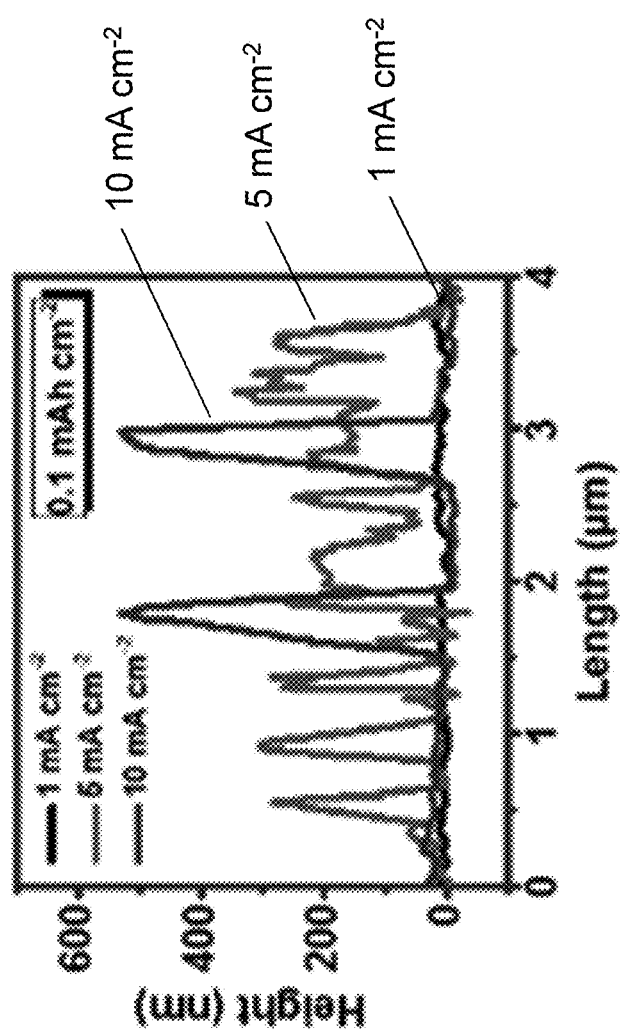
FIG. 10 is a plot of height against length showing the height distribution of the topographic features on the Zn electrode surfaces of FIGS. 9A to 9C in terms of current density.

As shown in FIG. 9A, the reactive side of the Zn electrode cycled at 1 mA cm$^{-2}$ showed the relatively flat surface. Once the current density was increased to 5 mA cm$^{-2}$, a plurality of Zn dendritic seeds with a half-hexagon morphology and an edge size of ca. 0.5 μm was vertically grown on the surface of the Zn electrode (FIG. 9B). When the current density was further elevated to 10 mA cm$^{-2}$, the edge size of the dendritic seeds was increased to ca. 0.9 μm, yet the number of the seeds was decreased (FIG. 9C). Generally, the dendritic nucleation stage may be described by the vertical formation of half-hexagon dendritic seeds on Zn electrode, of which the edge size increases while the number decreases with the enlarging current densities, which is also clearly revealed by evolution of height information as shown in FIG. 10.

Figure 11A:
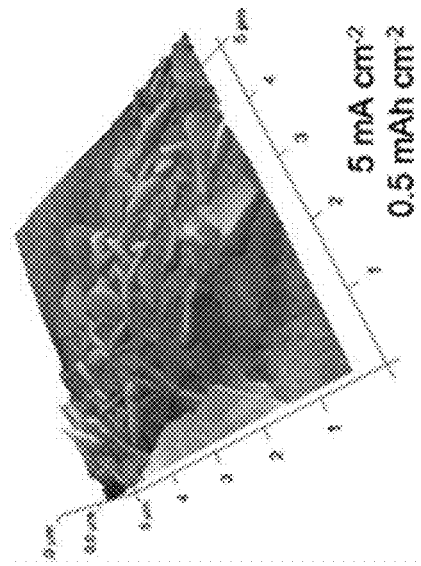
FIG. 11A is an AFM image of a Zn electrode of a ZIB after being cycled with a constant capacity of 0.5 mAh cm$^{-2}$ at a current density of 1 mA cm$^{-2}$. The AFM image shows the nucleation behavior of Zn dendrite at the initial stage.
Figure 11B:
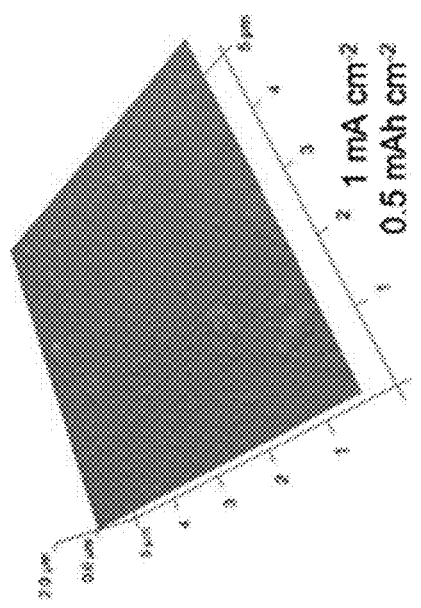
FIG. 11B is an AFM image of a Zn electrode of a ZIB after being cycled with a constant capacity of 0.5 mAh cm$^{-2}$ at a current density of 5 mA cm$^{-2}$. The AFM image shows the nucleation behavior of Zn dendrite at the initial stage.
Figure 11C:
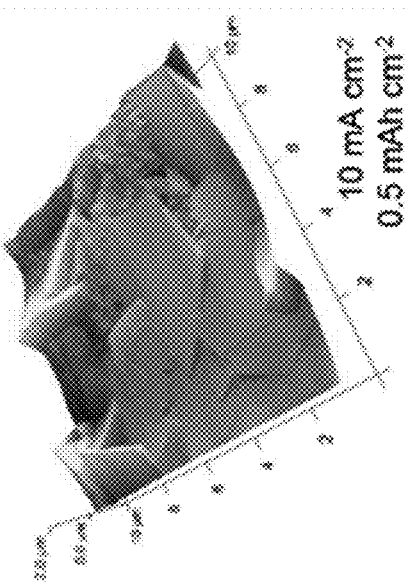
FIG. 11C is an AFM image of a Zn electrode of a ZIB after being cycled with a constant capacity of 0.5 mAh cm$^{-2}$ at a current density of 10 mA cm$^{-2}$. The AFM image shows the nucleation behavior of Zn dendrite at the initial stage.
Figure 12:
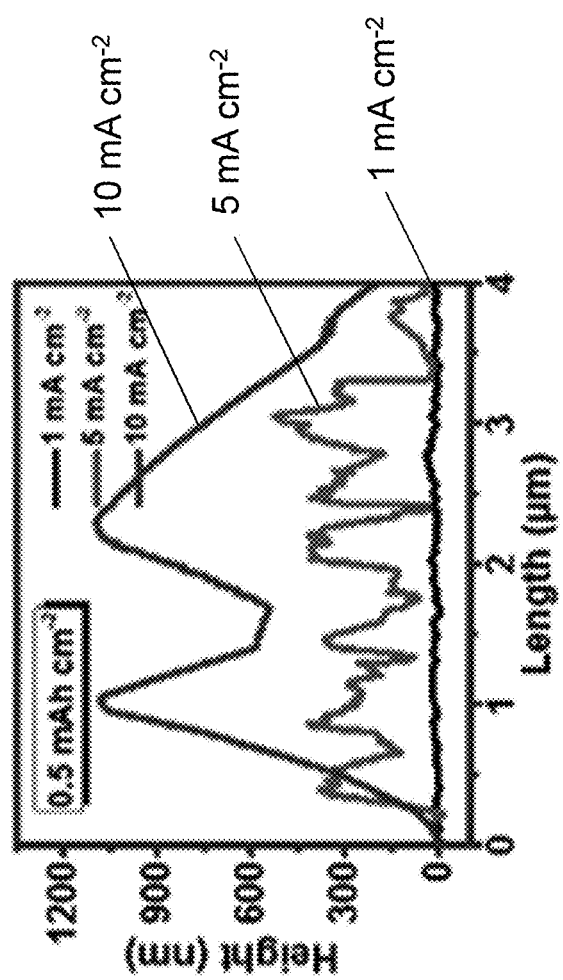
FIG. 12 is a plot of height against length showing the height distribution of the topographic features on the Zn electrode surfaces of FIGS. 11A to 11C in terms of current density.

A fresh symmetric ZIB was charged with a high capacity of 0.5 mAh cm$^{-2}$ to further study the effect of high capacity on the growth behavior of Zn dendrite at various current densities. As shown in FIG. 11A, the Zn electrode (0.5 mAh cm$^{-2}$) charged at 1 mA cm$^{-2}$ still maintained a relatively flat surface with some indistinct protuberances appeared on the surface compared with the Zn electrode charged to 0.1 mAh cm$^{-2}$ (FIG. 9A). However, the Zn electrode (0.5 mAh cm$^{-2}$) operated at 5 mA cm$^{-2}$ underwent a high amplification of 60% (ca. 0.8 μm) in edge size compared with the nucleation stage while the dendrite number remained basically unchanged (FIG. 11B). Similar dendritic growth behavior was also observed when the Zn electrode was operated at 10 mA cm$^{-2}$, with the size increased by 67% (ca. 1.5 μm) and the number remained unchanged (FIG. 11C).

Figure 14:
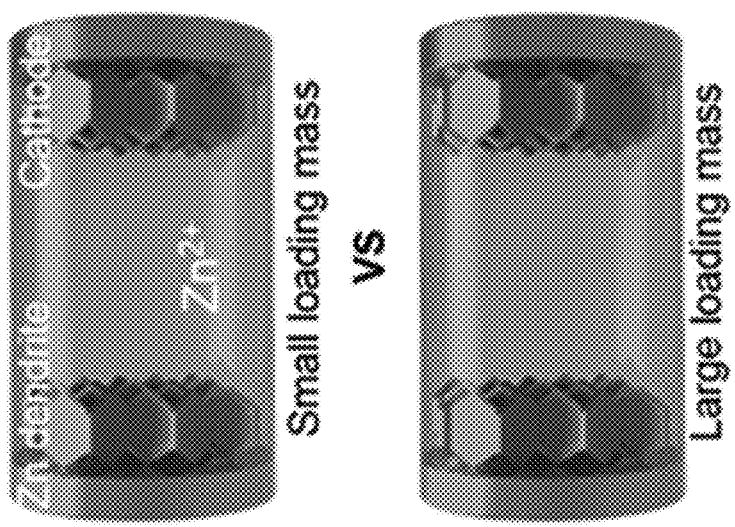
FIG. 14 is a schematic illustration of the effect of capacity on dendrite growth.

Based on the above, it is clear that the batteries charged to 0.5 mAh cm$^{-2}$ possess much larger dendrites at the same current densities as compared with their counterpart charged to 0.1 mAh cm$^{-2}$. This may reveal that a high capacity may remarkably accelerate the growth of dendrites (FIGS. 12, 13A to 13C). It is appreciated that the capacities described herein are corresponding to loading masses of cathode materials in a non-symmetric battery. For example, the theoretical capacity of 1 g MnO$_2$ is 308 mAh based on single-electron reaction while the value becomes 616 mAh when the loading mass is doubled. Hence, at a constant current density, a battery with a large cathodic loading mass will take more time to complete a single-time charge process and thus resulting in more severe dendrite formation (FIG. 14).

In view of the dependence of neutral Zn dendrite on current density and the nucleation-growth mechanism as mentioned above, an in-situ dendrite electro-healing methodology may be developed by mediating Zn stripping/plating behavior via manipulating the current density.

Figure 15:
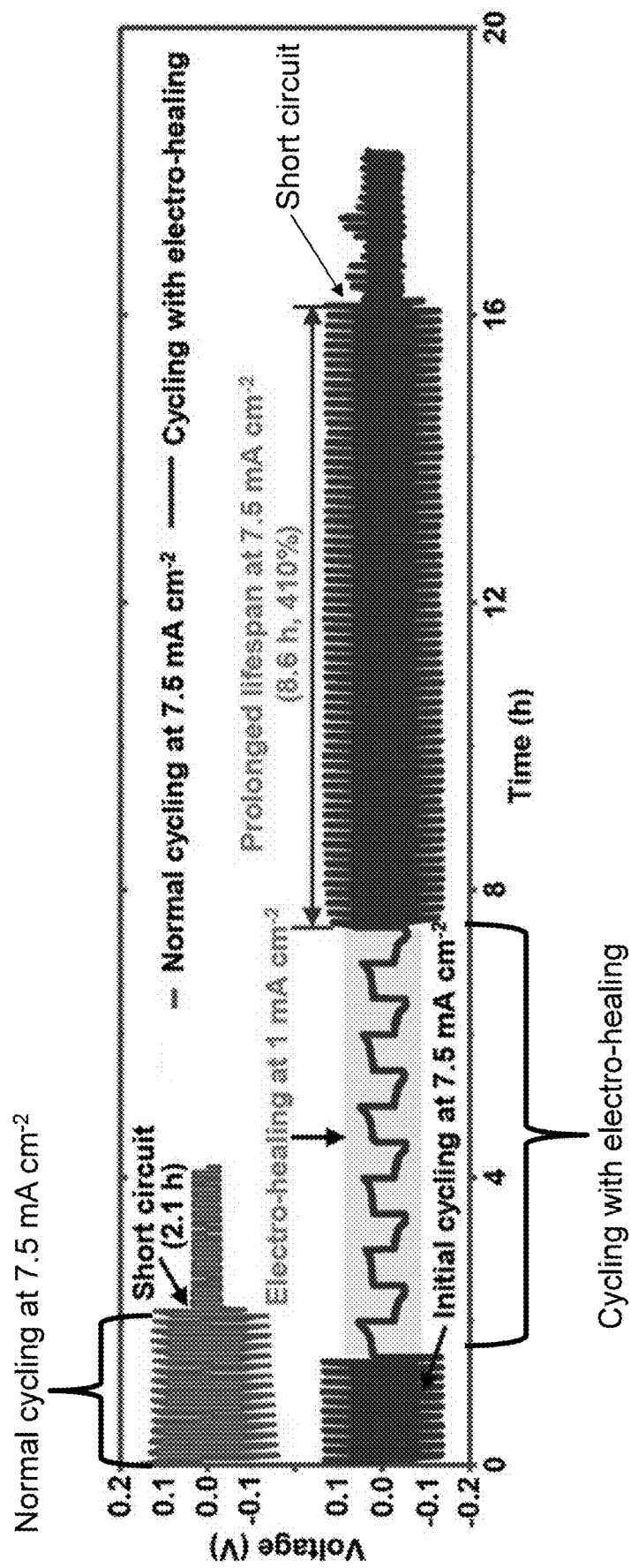
FIG. 15 is a plot of voltage against time showing the cycling profiles of a ZIB subjecting to a normal cycling and a cycling with electro-healing at a current density of 7.5 mA cm$^{-2}$.

Initially, the symmetric ZIB was cycled at 7.5 mA cm$^{-2}$ to permit the normal formation of Zn dendrites (FIG. 15). Next, this symmetric battery was resorted to dendritic electro-healing process in accordance with embodiments of the present invention, at 1 mA cm$^{-2}$ with the aim of eliminate the already-formed dendrites. In this example, 6 healing cycles (or a total period of approximately 6 hours) were performed at this relatively low current density. Alternatively, a different number of healing cycles or healing period may be used.

After the healing process, when the current density was returned back to a high one of 7.5 mA cm$^{-2}$, it was observed that the same battery could now be electrochemically stably cycled another 8.6 hours before internal short circuit.

In contrast, the ZIB cycled at a constant current density of 7.5 mA cm$^{-2}$ (without the electro-healing step) only exhibited a relatively short lifespan of ca. 2.1 h. In other words, by performing the electro-healing step, the lifespan of the ZIB was dramatically increased by 410% at 7.5 mA cm$^{-2}$.

Figure 16:
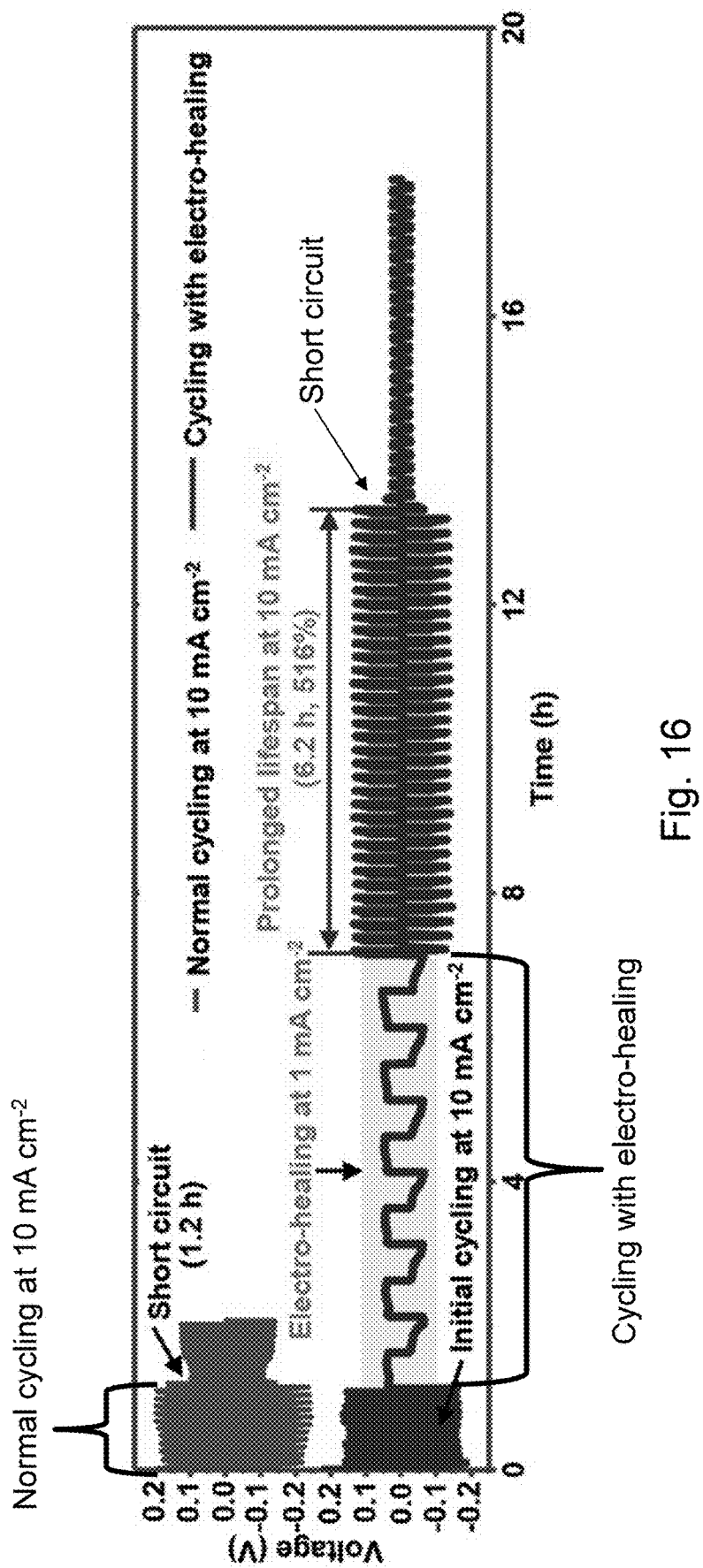
FIG. 16 is a plot of voltage against time showing the cycling profiles of a ZIB subjecting to a normal cycling and a cycling with electro-healing at a current density of 10 mA cm$^{-2}$.

Referring to FIG. 16, there is shown another experiment with similar healing process performed on the battery but a different nominal operation current density of 10 mA/cm$^{-2}$. In this example, the electro-healing process was found to be effective even at a higher current density of 10 mA cm$^{-2}$. In particular, the lifespan of the ZIB was increased by 516%.

Figure 17B:
FIG. 17B is a SEM image of a Zn electrode of FIG. 17A after being cycled at 1 mA cm$^{-2}$ for 3 hours.
Figure 17C:
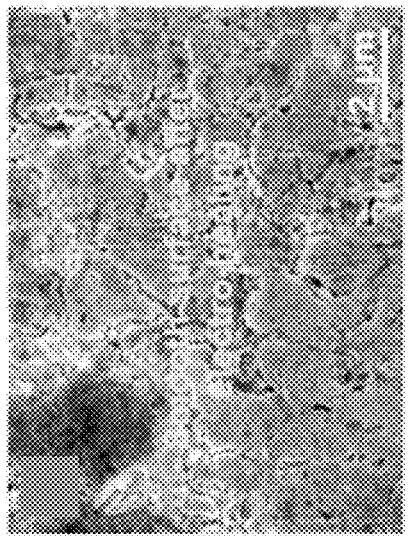
FIG. 17C is a SEM image of a Zn electrode of FIG. 17A after being cycled at 1 mA cm$^{-2}$ for 6 hours.
Figure 17A:
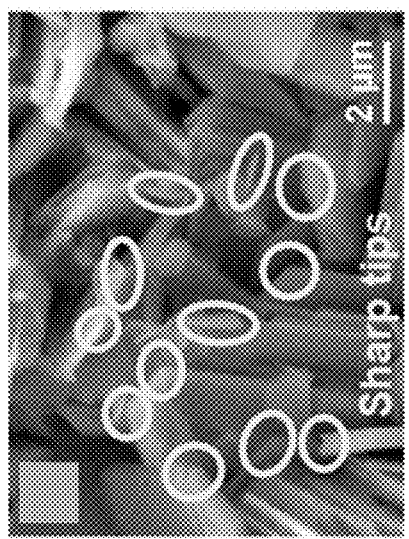
FIG. 17A is a SEM image of a Zn electrode of a ZIB after being cycled at 7.5 mA cm$^{-2}$ for 1.5 hours.
Figure 18B:
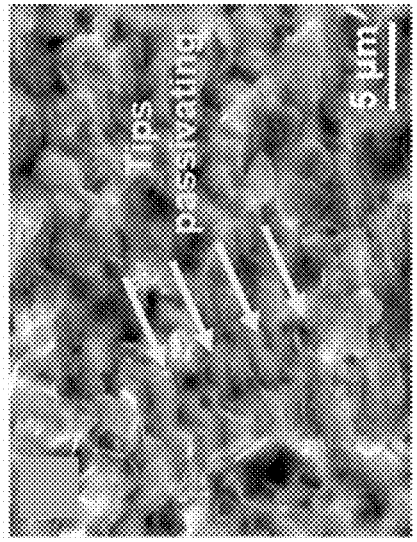
FIG. 18B is a SEM image of a Zn electrode of FIG. 18A after being cycled at 1 mA cm$^{-2}$ for 3 hours.
Figure 18C:
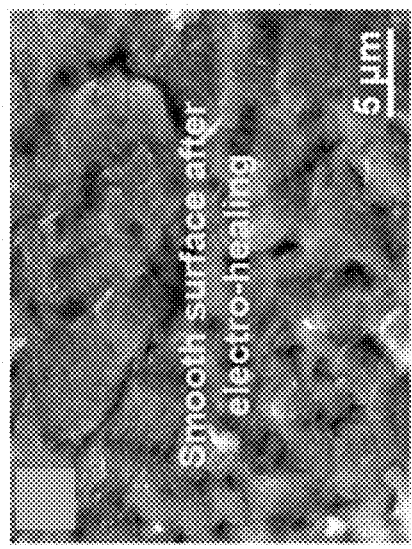
FIG. 18C is a SEM image of a Zn electrode of FIG. 18A after being cycled at 1 mA cm$^{-2}$ for 6 hours.
Figure 18A:
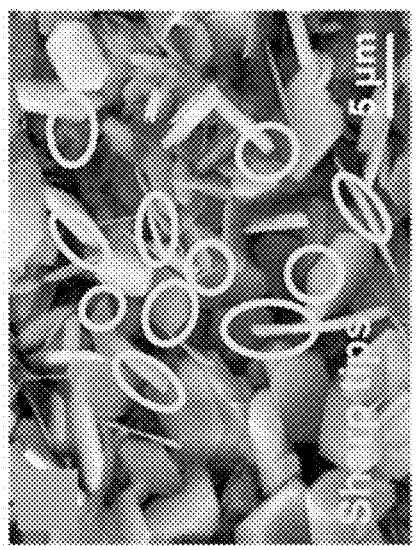
FIG. 18A is a SEM image of a Zn electrode of a ZIB after being cycled at 10 mA cm$^{-2}$ for 1.5 hours.

This extended lifespan was then investigated by morphological examination at different stages using SEM. As shown in FIG. 17A, the Zn electrode of ZIB cycled at 7.5 mA cm$^{-2}$ after 1.5 hours showed a plurality of vertically-grown Zn dendrites with enormous sharp tips thereon. However, after being cycled at a low current density of 1 mA cm$^{-2}$ for 3 hours, the Zn electrode experienced a passivation of sharp tips while the valley-like landform was partially filled, indicating a change of Zn deposition behavior at low current densities (FIG. 17B). When extending the electro-healing duration to 6 hours, the Zn electrode showed a relatively smooth surface compared with the dendritic one at 7.5 mA cm$^{-2}$ (FIGS. 17A and 17C). Similar morphological evolution was also observed for the Zn electrode of the ZIB cycled at 10 mA cm$^{-2}$ (FIGS. 18A to 18C).

The effect of the electro-healing process may be accounted for by the preferred Zn stripping at the sharp tips of Zn dendrites, therefore generating smooth edges, which is beneficial to restrict the tip-growth behavior (FIGS. 2A and 2C). The subsequent repeated Zn plating/stripping procedures at the low current density produces a smooth yet large-area electrode surface to lower the localized current density (FIG. 4C). The synergistic effect between the restricted tip-growth behavior and the lowered localized current density may therefore contribute to a prolonged lifespan of the battery.

The method of the present invention is advantageous since the method can effectively eliminate any dendritic structures that are already formed on the electrode surface of a battery in an in-situ way. That is, the dendritic structures can be removed without dissembling the battery, which remarkably enhances the sustainability of the battery.

In addition, with the use of the presently claimed method, the lifespan of the battery can be extended by at least 400% as compared with those without using the presently claimed method.

Furthermore, the method of the present invention is capable of increasing the lifespan of a brand-new battery, which does not have any dendritic structures formed yet. As such, the method may be applied prior to a battery leaving the manufacturing factory so as to enhance the lifespan of the battery.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for manipulating an energy storage device, comprising a step of charging and discharging the energy storage device at a first current density for a first period of time, wherein the first current density is lower than a nominal operating current density of the energy storage device; wherein the step of charging and discharging at the first current density is arranged to smooth a surface of an anode of the energy storage device; and further comprising a step of initiating a formation of dendritic structures, prior to the step of charging and discharging the energy storage device at the first current density.

2. A method for manipulating an energy storage device according to claim 1, wherein the initiation of dendritic structures formation is performed by charging and discharging the energy storage device at a second current density for a second period of time.

3. A method for manipulating an energy storage device according to claim 2, wherein the second current density is higher than the nominal operating current density.

4. A method for manipulating an energy storage device according to claim 2, wherein the second current density is equal to the nominal operating current density.

5. A method for manipulating an energy storage device according to claim 2, wherein the second current density is about 5 to 10 mA cm$^{-2}$.

6. A method for manipulating an energy storage device according to claim 2, wherein the charging and discharging of the energy storage at the second current density lasts for about 1 to 1.5 h.

7. A method for manipulating an energy storage device according to claim 1, further comprising a step of restoring the nominal operating current density of the energy storage device from the first current density, thereby terminating the manipulation of the device.

8. A method for manipulating an energy storage device according to claim 1, wherein the first current density is about 0.1 to 1 mA cm$^{-2}$.

9. A method for manipulating an energy storage device according to claim 1, wherein the charging and discharging of the energy storage at the first current density lasts for about 3 to 6 h.

10. A method for manipulating an energy storage device according to claim 1, wherein the anode includes zinc.

11. A method for manipulating an energy storage device according to claim 1, wherein the energy storage device includes an aqueous electrolyte selected from at least one of an aqueous solution of zinc sulfate, zinc chloride, zinc acetate, or zinc trifluoromethanesulfonate.

12. A method for manipulating an energy storage device according to claim 11, wherein the aqueous electrolyte is at a concentration of 0.2 to 3 M.

13. A method for manipulating an energy storage device according to claim 1, wherein operation lifetime of the energy storage device is increased by at least 400% after subjecting to the step of charging and discharging at the first current density.

14. A method for manipulating an energy storage device according to claim 1, wherein the device is a rechargeable battery.

15. A method for manipulating an energy storage device, comprising a step of charging and discharging the energy storage device at a first current density for a first period of time, wherein the first current density is lower than a nominal operating current density of the energy storage device; wherein the step of charging and discharging at the first current density is arranged to smooth a surface of an anode of the energy storage device; wherein the step of charging and discharging at the first current density is arranged to reduce a topographic feature on the surface of the anode; wherein the step of charging and discharging at the first current density is arranged to eliminate dendritic structures on the surface of the anode; and wherein the step of charging and discharging at the first current density involves plating and stripping of an anode material on the surface of the anode, thereby passivating sharp tips on the dendritic structures.

16. A method for manipulating an energy storage device according to claim 15, wherein during the stripping of the anode material on the surface of the anode, the sharp tips on the dendritic structures are stripped such that smooth edges form on the dendritic structures.

17. A method for manipulating an energy storage device according to claim 16, wherein the formation of smooth edges causes a reduction of localized current density on the surface of the anode, thereby suppressing dendritic structures generation.

18. A method for manipulating an energy storage device according to claim 15, wherein the method further comprising a step of restoring the nominal operating current density of the energy storage device from the first current density, thereby terminating the manipulation of the device.

19. A method for manipulating an energy storage device according to claim 15, wherein the first current density is about 0.1 to 1 mA cm$^{-2}$.

20. A method for manipulating an energy storage device according to claim 15, wherein the charging and discharging of the energy storage at the first current density lasts for about 3 to 6 h.

21. A method for manipulating an energy storage device according to claim 15, wherein the anode includes zinc.

22. A method for manipulating an energy storage device according to claim 15, wherein the energy storage device includes an aqueous electrolyte selected from at least one of an aqueous solution of zinc sulfate, zinc chloride, zinc acetate, or zinc trifluoromethanesulfonate.

23. A method for manipulating an energy storage device according to claim 22, wherein the aqueous electrolyte is at a concentration of 0.2 to 3 M.

24. A method for manipulating an energy storage device according to claim 15, wherein operation lifetime of the energy storage device is increased by at least 400% after subjecting to the step of charging and discharging at the first current density.

25. A method for manipulating an energy storage device according to claim 15, wherein the device is a rechargeable battery.

* * * * *